United States Patent
Madden

(10) Patent No.: US 7,743,338 B2
(45) Date of Patent: Jun. 22, 2010

(54) IMAGE RENDERING WITH IMAGE ARTIFACT ALONG A MULTIDIMENSIONAL PATH

(75) Inventor: Thomas Michael Madden, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 11/530,824

(22) Filed: Sep. 11, 2006

(65) Prior Publication Data

US 2010/0111434 A1 May 6, 2010

(51) Int. Cl.
G06F 3/048 (2006.01)

(52) U.S. Cl. ...................... 715/781; 715/768; 715/810; 715/861

(58) Field of Classification Search ................ 715/802, 715/781, 838, 861, 763, 767, 768, 810, 841, 715/859, 860, 864
See application file for complete search history.

(56) References Cited

U.S. PATENT DOCUMENTS

| | | | |
|---|---|---|---|
| 5,619,249 A | 4/1997 | Billock et al. | |
| 5,717,879 A | 2/1998 | Moran et al. | |
| 5,822,123 A | 10/1998 | Davis et al. | |
| 5,880,768 A | 3/1999 | Lemmons et al. | |
| 6,006,227 A | 12/1999 | Freeman et al. | |
| 6,335,737 B1 | 1/2002 | Grossman et al. | |
| 6,448,987 B1 | 9/2002 | Easty et al. | |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,944,632 B2 | 9/2005 | Stern | |
| 7,292,243 B1 | 11/2007 | Burke | |
| 7,362,331 B2 * | 4/2008 | Ording ....................... 345/473 |
| 7,363,591 B2 | 4/2008 | Goldthwaite et al. | |
| 2002/0033848 A1 | 3/2002 | Sciammarella et al. | |
| 2002/0083469 A1 | 6/2002 | Jeannine et al. | |
| 2002/0175931 A1 | 11/2002 | Holtz et al. | |
| 2003/0110450 A1 * | 6/2003 | Sakai ........................ 715/529 |
| 2003/0117425 A1 | 6/2003 | O'Leary et al. | |
| 2003/0142751 A1 * | 7/2003 | Hannuksela ........... 375/240.25 |
| 2003/0174160 A1 | 9/2003 | Deutscher et al. | |

(Continued)

FOREIGN PATENT DOCUMENTS

EP 1 469 375 A1 10/2004

(Continued)

OTHER PUBLICATIONS

"Fading Image Rollovers," http://web.archive.org/web/20060111080357/http://www.javascript-fx.com/fade_rollovers/general_help/help.html, Jan. 11, 2006, 1 page.*

(Continued)

Primary Examiner—Adam L Basehoar
Assistant Examiner—Rashawn Tillery
(74) Attorney, Agent, or Firm—Fish & Richardson P.C.

(57) ABSTRACT

Display positions are arranged along a multidimensional path. Images and blurred versions of the images are displayed in one or more of the of the display positions. An opacity value of one or more of the blurred versions of the images is adjusted based the display positions in which the one or more blurred versions of the images are displayed.

31 Claims, 13 Drawing Sheets

U.S. PATENT DOCUMENTS

| | | | |
|---|---|---|---|
| 2004/0008211 | A1 | 1/2004 | Soden et al. |
| 2004/0100479 | A1* | 5/2004 | Nakano et al. ............... 345/700 |
| 2004/0140995 | A1 | 7/2004 | Goldthwaite et al. |
| 2004/0150657 | A1 | 8/2004 | Wittenburg et al. |
| 2004/0261031 | A1 | 12/2004 | Tuomainen et al. |
| 2005/0041033 | A1* | 2/2005 | Hilts et al. ................... 345/589 |
| 2005/0044499 | A1 | 2/2005 | Allen et al. |
| 2005/0091597 | A1 | 4/2005 | Ackley |
| 2005/0160375 | A1 | 7/2005 | Sciammarella et al. |
| 2005/0246654 | A1 | 11/2005 | Hally et al. |
| 2005/0278656 | A1 | 12/2005 | Goldthwaite et al. |
| 2006/0020962 | A1 | 1/2006 | Stark et al. |
| 2006/0031776 | A1* | 2/2006 | Glein et al. ................. 715/779 |
| 2006/0265409 | A1 | 11/2006 | Neumann et al. |
| 2007/0162853 | A1* | 7/2007 | Weber et al. ................ 715/719 |
| 2007/0288863 | A1* | 12/2007 | Ording et al. ............... 715/788 |
| 2008/0062894 | A1 | 3/2008 | Ma et al. |
| 2008/0065638 | A1 | 3/2008 | Brodersen et al. |
| 2008/0065720 | A1 | 3/2008 | Brodersen et al. |
| 2008/0066010 | A1 | 3/2008 | Brodersen et al. |
| 2008/0066013 | A1 | 3/2008 | Brodersen et al. |
| 2008/0066110 | A1 | 3/2008 | Brodersen et al. |
| 2008/0092168 | A1 | 4/2008 | Logan et al. |
| 2008/0122870 | A1 | 5/2008 | Brodersen et al. |

FOREIGN PATENT DOCUMENTS

| | | | |
|---|---|---|---|
| EP | 1 510 911 A2 | 3/2005 | |

OTHER PUBLICATIONS

"Animated Image Blur," http://web.archive.org/web/20060430062528/http://www.tutorio.com/tutorial/animated-image-blur, Apr. 30, 2006, 2 pages.*

U.S. Examiner Enrique W. Iturralde, USPTO Final Office in U.S. Appl. No. 11/530,808, mailed May 13, 2009, 15 pages.

"Blurring Animation in Flash," http://republicofcode.com/tutorials/flash/blurring_con, 3 pages.

* cited by examiner

IMAGE RENDERING WITH IMAGE ARTIFACT ALONG A MULTIDIMENSIONAL PATH

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc. The functions can then be accessed through various user interfaces that are typically arranged in a hierarchal manner, having a "root" or "home" user interface at the top of the hierarchy, from which the various context-dependent user interfaces are accessible. The user interfaces can include both graphical and textual features. It is desirable that the user interface conveys information to the user in an intuitive manner.

Graphical processing, however, can consume processing resources. If a media system does not have adequate processing resources, such as may occur when multiple system processes are being handled by the media system, the graphical features within the user interface may not be rendered adequately. For example, the graphical features may not transition smoothly across the user interface, or may display noticeable color variations, or other processing artifacts. Accordingly, it is desirable to render graphical images and effects while minimizing the processing resources for such rendering and effects.

SUMMARY

Disclosed herein are systems and methods for rendering images along a multidimensional path in a user interface. In one implementation, a plurality of display positions along a multidimensional path are arranged. Images are displayed in one or more of the display positions, and blurred versions of the images are also displayed in one or more of the of the display positions. Opacity values of the blurred versions of the images based the display positions in which the blurred versions of the images are displayed are adjusted to create a blurring effect.

In another implementation, an image and an artifact of the image are stored, and a plurality of display positions is arranged along a multidimensional path. The image and the artifact of the image are displayed at one of the display positions, and an opacity value of the artifact of the image is adjusted based on the one of the display positions.

In another implementation, a computer readable medium stores instructions that are executable by a processing device. Execution of the instructions causes the processing device to generate an interface environment and generate images and corresponding blurred versions of the images. One of the images is displayed in a foreground position in the interface environment, and one or more of the images and corresponding blurred versions of the images are displayed in background positions in the interface environment. The images and the corresponding blurred versions of the images are transitioned between the foreground position and the background positions, and opacity values for the corresponding blurred versions of the images are adjusted based on the positions at which the corresponding blurred versions of the images are displayed.

DETAILED DESCRIPTION

Figures 1, 2:
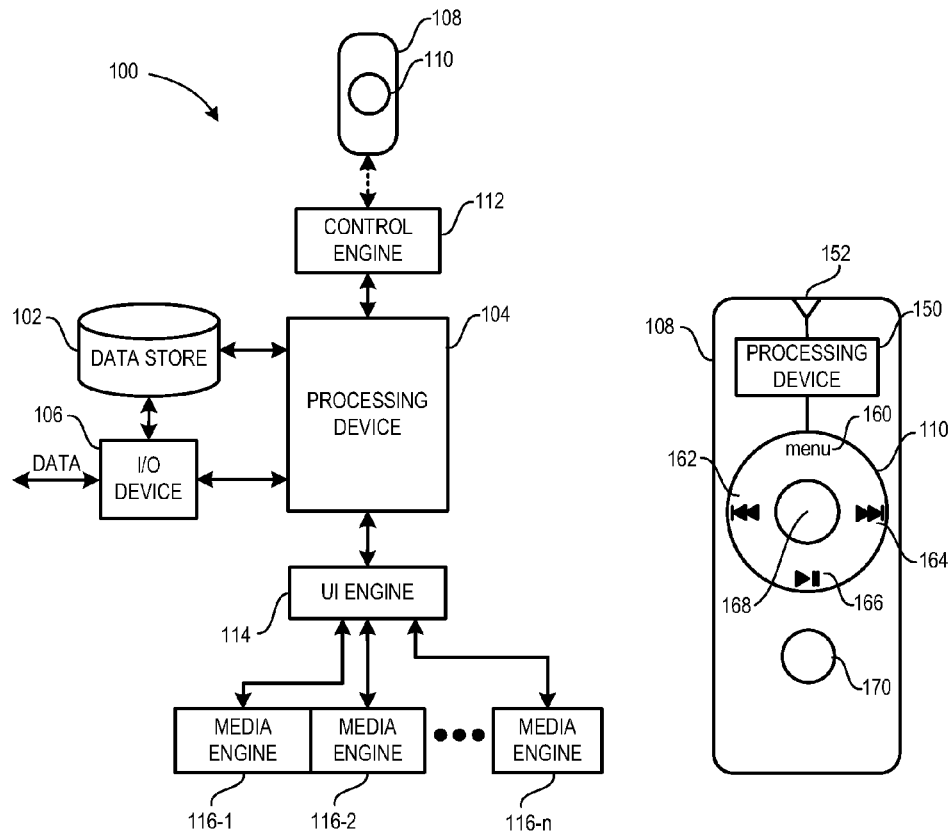
FIG. 1 is a block diagram of an example media processing system.
FIG. 2 is a block diagram of an example remote control device for the media processing system.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, control payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-n. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and θ, or can be disposed according to Cartesian coordinates, i.e., x and y.

The rotation input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

Figure 3:
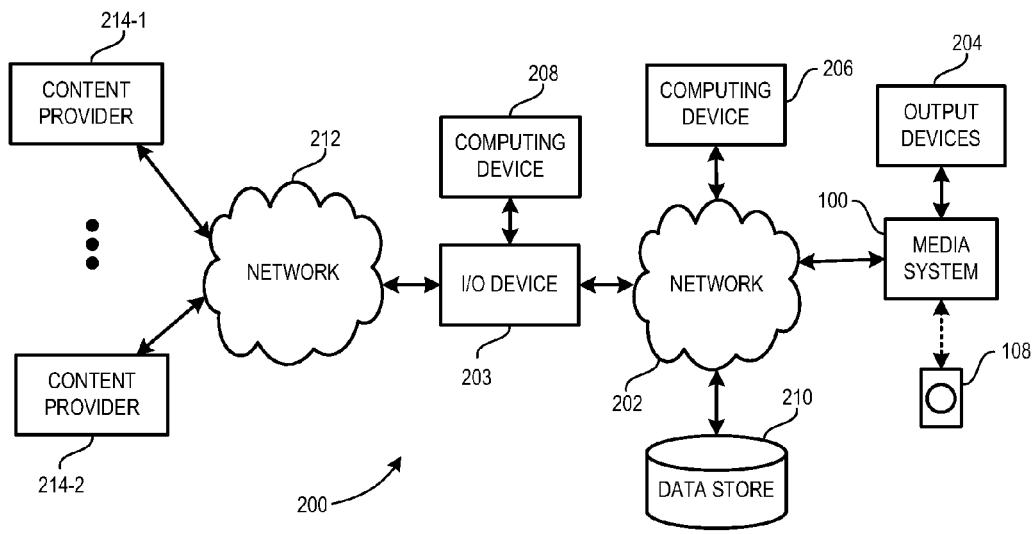
FIG. 3 is an example network environment in which a media processing system in accordance with FIG. 1 may be implemented.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 thorough other network configuration, e.g., through a direction connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other computing devices or data stores 210 available on the network 202 through sharing. Thus, if any one or more of the computing devices or data stores are unavailable, media data and/or metadata one the remaining computing devices or other such computing devices or data stores can still be accessed.

Figure 4:
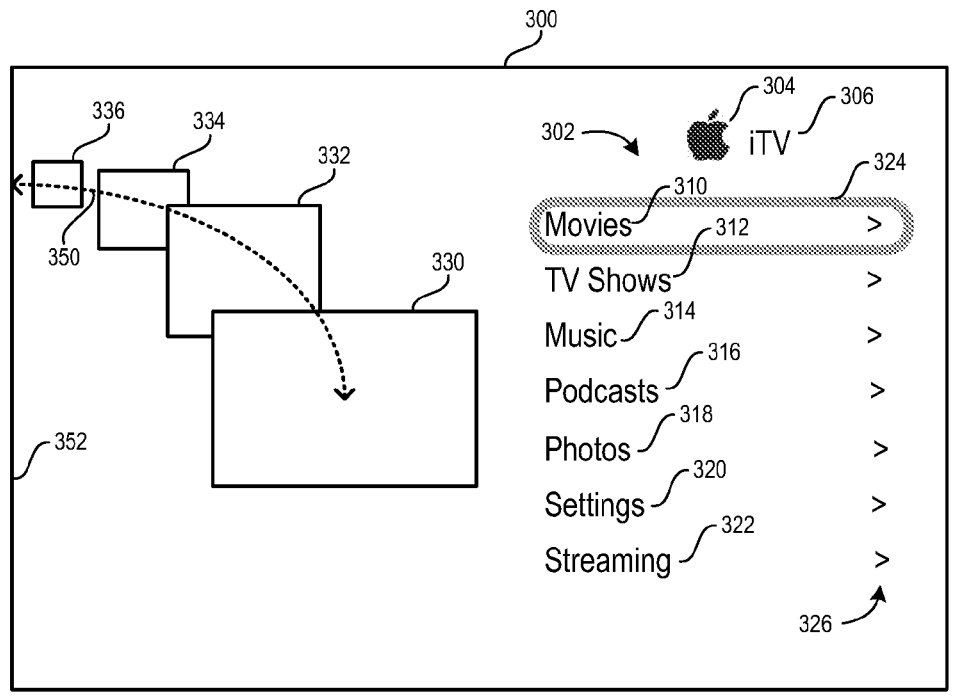
FIG. 4 is a block diagram of an example media menu interface environment.

FIG. 4 is a block diagram of an example media menu interface environment 300. The example media menu interface environment 300 provides a menu interface from which one or more of a plurality of content-specific menus and corresponding functions may be selected.

In one implementation, the media menu interface environment 300 includes a media menu 302 identified in part by an icon 304 in a title location and a title 306, e.g., "iTv." The media menu 302 includes media menu items 310, 312, 314, 316, 318, 320 and 322, respectively entitled "Movies," "TV Shows," "Music," "Podcasts," "Photos," "Settings," and "Streaming." The media menu 302 can also include a highlight indicator 324 that highlights a media menu item. In one implementation, the highlight indicator 324 is a graphical indicator that provides the effect of a diffused backlighting, e.g., a glow highlight that provides the appearance of a backlit surface beneath the highlighted menu item.

A highlight selection of a menu item by the highlight indicator 324 indicates that the menu item is eligible for a further selection action, e.g., eligible to be selected by actuating the select area 168 on the rotational input device 110. The highlight indicator 324 can be moved vertically, for example, by actuating menu area 160 and the play/pause area 164 on the rotational input device 110.

Upon the further selection, a process associated with the highlighted menu item is performed. In one implementation, selection of the media menu item 310 when highlighted generates a movie content menu environment for processing media data related to movies, such as movie previews and full-length movies. Selection of the media menu item 312 when highlighted generates a TV Shows content menu environment for processing media data related to television programs, such as program episodes. Selection of the media menu item 314 when highlighted generates a Music content menu environment for processing media data related to music, such as audio files and music video files. Selection of the media menu item 316 when highlighted generates a Podcasts content menu environment for processing media data related to podcasts. Selection of the media menu item 318 when highlighted generates a Photos content menu environment for processing media data related to photos, such as photographs and videos. Selection of the media menu item 320 when highlighted generates a settings menu environment for changing settings of the media system, such as setting restrictions and shared files. Selection of the media menu item 322 when highlighted generates a Streaming menu environment for identifying and selecting media data stored on data stores or computer devices accessible through a network, such as media data stored on computing devices 206 and 208 and data store 210 and accessible over the network 202 of FIG. 2.

The media menu 302 can also include a child indicator 326 associated with a media menu item. The child indicator 326 indicates that one or more sub-menus or sub-items, e.g., folders, will become available or will be accessed upon selection of the corresponding media menu item.

The media menu interface environment 300 also includes media menu item abstractions that correspond to one or more of the media menu items. For example, the media menu item abstractions 330, 332, 334 and 336 correspond to media menu items 310, 312, 314 and 316, respectively. In one implementation, the media menu item abstractions are graphical representations of the content of corresponding media menu items. For example, the media menu item abstraction 330, which corresponds to the Movies media menu item 310, can be a movie icon. Likewise, the media menu item abstraction 332, which corresponds to the TV Shows media menu item 312, can be a television icon; the media menu item abstraction 334, which corresponds to the Music media menu item 314, can be a music icon, etc.

In one implementation, the media menu item abstractions 330-336 are arranged such that at least one of the media menu item abstractions, e.g., icon 330, is in a foreground position, and the remaining the media menu item abstractions, e.g., icons 332-336, are in one or more background positions. The foreground and background positions define a multidimensional path 350, and the media menu item abstraction 336 is in a background position that defines a terminus of the multidimensional path. In one implementation, the terminus is at the edge 352 of the media menu interface environment 300.

In one implementation, the media menu item abstraction corresponding to a highlighted menu is displayed in the foreground position. For example, in FIG. 4, the media menu item abstraction 330, which corresponds to the highlighted Movies media menu item 310, is displayed in the foreground position.

In another implementation, one or more of the media menu item abstractions in the background positions may be displayed with an effect, e.g., a blurring effect. The blurring effect can be used to further deemphasize the media menu item abstractions as being within the background. For example, in FIG. 4, the media menu items 332-336 can be blurred. In another implementation, a media menu item abstraction is blurred to a degree substantially or functionally proportional to the proximity of the media menu item abstraction to the foreground position. For example, the media menu item abstraction 336 can be extremely blurred, while the media menu item abstraction 332 can be only slightly out of focus.

In another implementation, media menu item abstractions are scaled in size, for example, substantially or functionally proportionally to the proximity of the media menu item abstraction to the foreground position. For example, the media menu item abstraction 336 can be displayed at approximately 20% of full scale, and the media menu item abstraction 330 can be displayed at 100% of full scale.

In one implementation, changing the position of the highlight indicator 324 causes the highlight indicator to transition from a highlighted media menu item to a media menu item to be highlighted, e.g., an adjacent media menu item. The transition of the highlight indicator 324 likewise causes the media menu item abstractions to transition between the foreground and background positions along the multidimensional path 350 until the media menu item abstraction corresponding to the newly-highlighted media menu item is in the foreground position.

Figure 5:
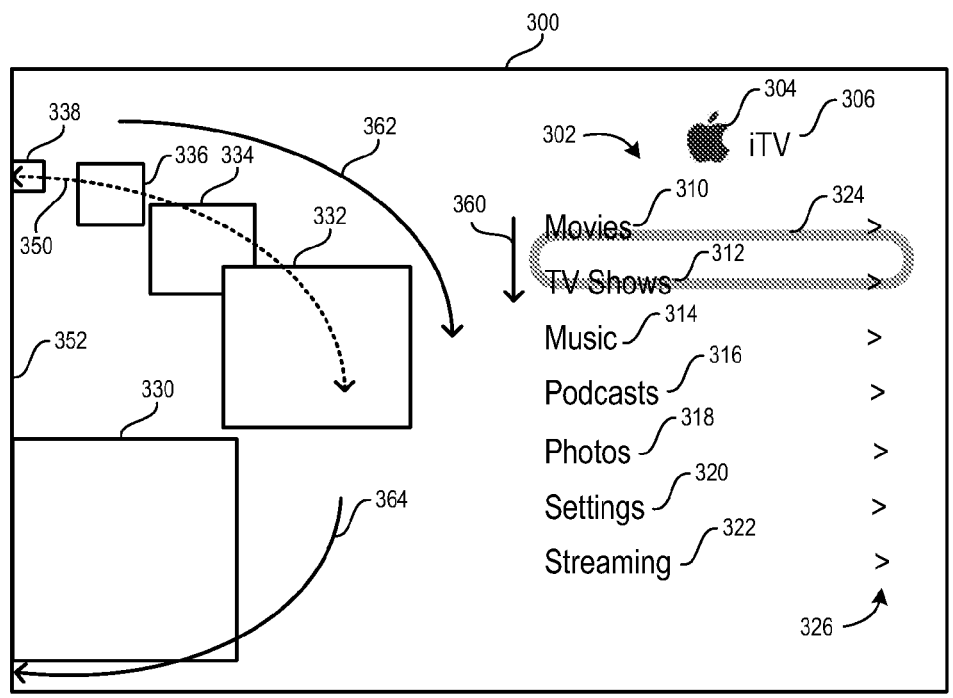
FIGS. 5 and 6 are block diagrams of an example transition of media menu item abstractions in the media menu interface environment.
Figure 6:
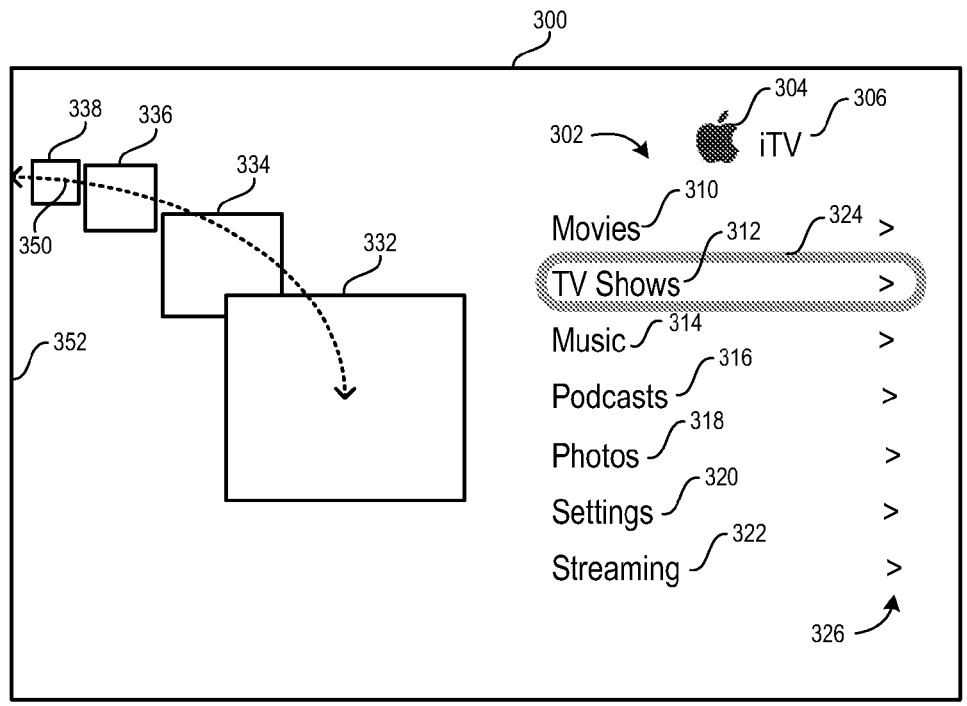

FIGS. 5 and 6 are block diagrams of an example transition of media menu item abstractions in the media menu interface environment 300. In FIG. 5, the highlight indicator 324 is transitioned from media menu item 310 to media menu item 312, as indicated by the directional arrow 360. In response, the media menu item abstractions 332, 334 and 336 transition along the multidimensional path 350, as indicated by the directional arrow 362. In the example shown, the media menu item abstraction 336 transitions out of the terminus position, another media menu item abstraction 338, which corresponds to the Photos media menu item 318, emerges into the terminus position. In this implementation, the media menu item abstraction 338 emerges from the edge 352 of the media menu interface environment 300.

Because the media menu item abstraction 332 is transitioning from a background position into the foreground position previously occupied by media menu item abstraction 330, the media menu item abstraction 330 transitions out of the media menu interface environment 300, as indicated by directional arrow 364. In the example implementation shown in FIG. 5, the media menu item abstraction 330 transitions off the edge 352 of the media menu interface environment 300.

In one implementation, the scale of the media menu item abstraction transitioning off the edge 352 of the media menu interface environment 300 can be increased to simulate a "fly by" effect. For example, the scale of the media menu item abstraction 330 can be proportionally increased from 100% to 150% of full scale as the media menu item abstraction 330 transitions from the foreground position to the edge 352 of the media menu interface environment 300.

FIG. 6 is a block diagram of the end result of the transition of the menu abstractions in the media menu interface environment 300. The arrangement of the media menu item abstractions is similar to that of FIG. 4, except that the media menu item abstraction 332 is now in the foreground position and the media menu item abstractions 334, 336 and 338 are in the background positions. Likewise, the TV Shows media menu item 312, which corresponds to the media menu item abstraction 332 in the foreground position, is now highlighted by the highlight indicator 324.

Figure 7:
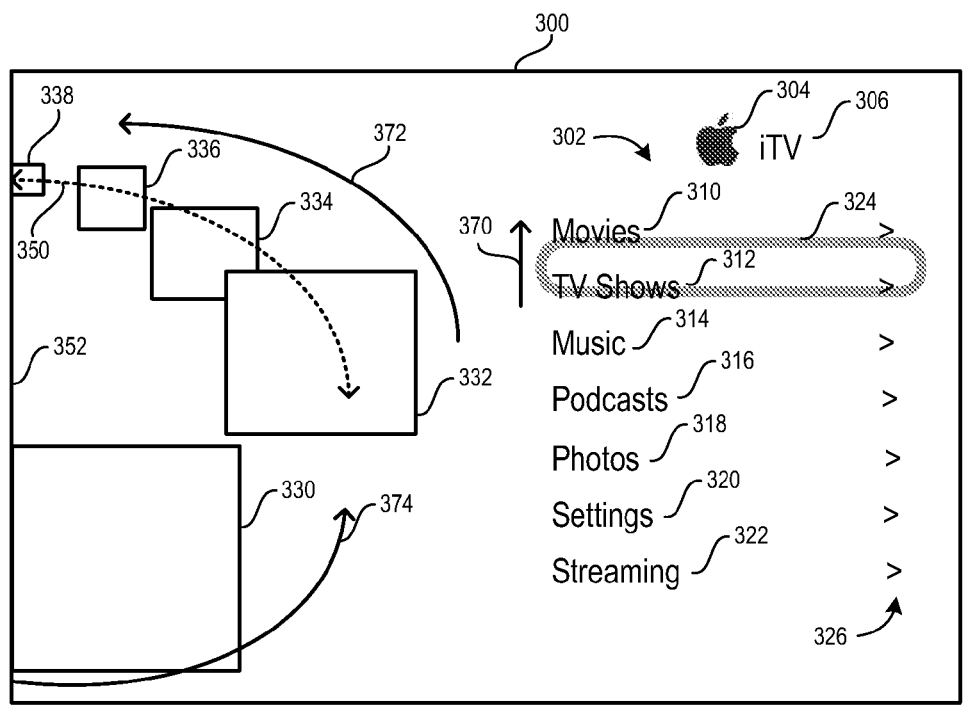
FIG. 7 is a block diagram of another example transition of media menu item abstractions in the media menu interface environment.

FIG. 7 is a block diagram of another example transition of media menu item abstractions in the media menu interface environment 300. In FIG. 7, the highlight indicator 324 is transitioned from media menu item 312 to media menu item 310, as indicated by the directional arrow 370. In response, the media menu item abstractions 332, 334, 336 and 338 transition along the multidimensional path 350, as indicated by the directional arrow 372. During this transition, the media menu item abstraction 332 also transitions from a foreground position to a background position, and the media menu item abstraction 338 transitions from the terminus position out of the media menu interface environment 300 through the edge 352. As the media menu item abstraction 338 transitions out of the terminus position, another media menu item abstraction 336, which corresponds to the Podcasts media menu item 316, emerges into the terminus position.

The media menu item abstraction 330, which corresponds to the Movies menu item 310 which is to be highlighted by the highlight indicator 324, emerges from the edge 352 and back into the foreground position, as indicated by the directional arrow 374. In the example implementation shown in FIG. 7, the media menu item abstraction 330 emerges from the edge 352 of the media menu interface environment at an increased scale to simulate a "fly by" effect. For example, the scale of the media menu item abstraction 330 can be proportionally decreased from 150% to 100% of full scale as the media menu item abstraction 330 transitions from the edge 352 of the media menu interface environment 300 to the foreground position.

Once the transitions indicated by the directional arrows 370, 372 and 374 are complete, the media menu interface environment 300 returns to the state as depicted in FIG. 4. Other transitions can also be used.

Figure 8:
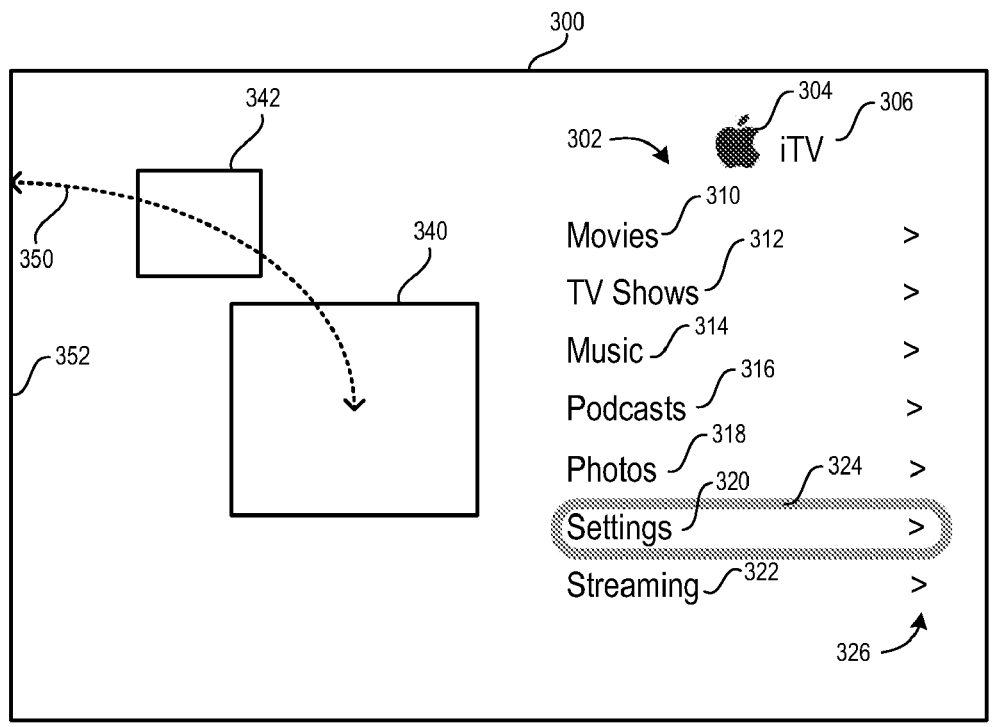
FIG. 8 is a block diagram of an example display of media menu item abstractions based on a selected menu item.

FIG. 8 is a block diagram of an example display of media menu item abstractions based on a selected menu item 320. In this example implementation, the highlight indicator 324 can transition vertically between media menu items 310 and 322, but does not wrap between media menu items 310 and 322. Thus to return the highlight indicator 324 to the media menu item 310, the highlight indicator 324 must transition through the media menu items 318, 316, 314 and 312. The media menu item abstractions 340 and 342 transition through the multidimensional path in a similar manner. For example, transitioning the highlight indicator 324 to the Streaming media menu item 322 will cause the media menu item abstraction 340 to transition out of the media menu interface environment 300 through the edge 352, and cause the media menu item abstraction 342 to transition from the background position into the foreground position. In the example implementation of FIG. 8, the highlight indicator 324 cannot transition beyond the Streaming media menu item 322, and thus additional media menu item abstractions do not transition into the terminus position.

Likewise, transitioning the highlight indicator 324 to the photos media menu item 318 will cause the media menu item abstraction 340 to transition into a background position and the media menu item abstraction 342 to transition further into the background positions, and will also cause the media menu item abstraction 338 to emerge into the foreground position.

Figure 9:
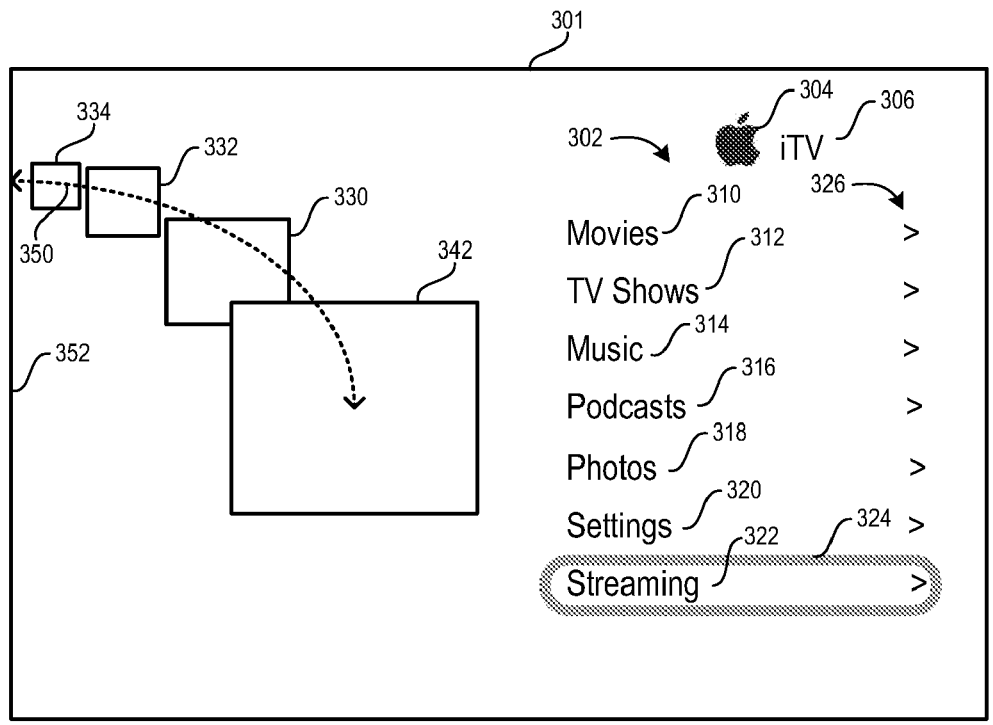
FIG. 9 is a block diagram of another example media menu interface environment.

FIG. 9 is a block diagram of another example media menu interface environment 301. In this example implementation, the highlight indicator 324 can transition vertically between media menu items 310 and 322, and can wrap between media menu items 310 and 322. Thus, to return the highlight indicator 324 to the media menu item 310, the highlight indicator 324 can transition out of the bottom of the media menu 302 and reappear at the top of the media menu 302, beneath the icon 304. The media menu item abstraction 342 thus transitions out of the media menu interface environment 301. Additionally, the media menu item abstractions 330, 332 and 334 transition through the background positions, and the media menu item abstraction 336 emerges from the edge 352 into the terminus position.

Figure 10:
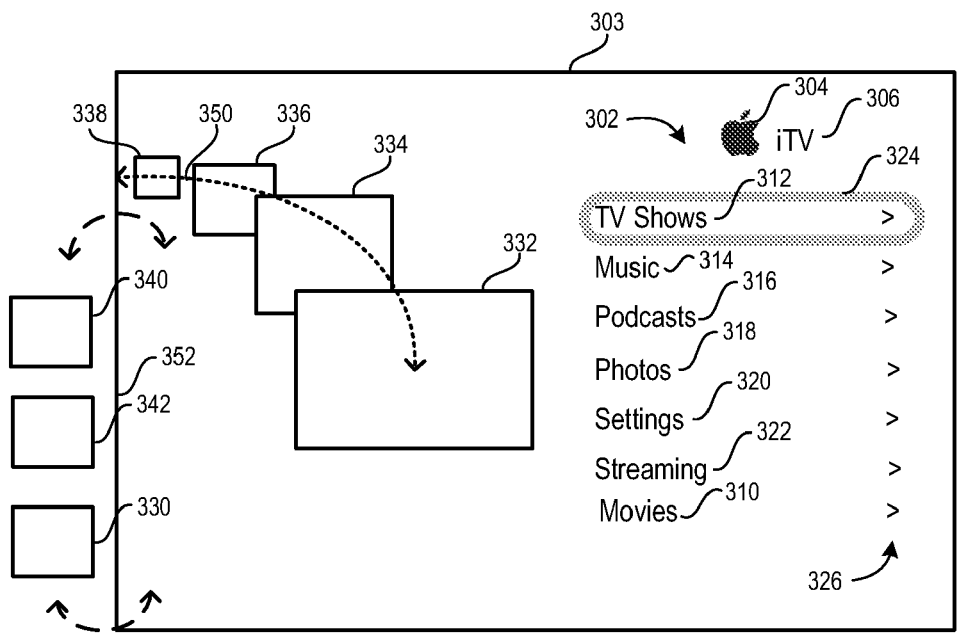
FIG. 10 is a block diagram of another example media menu interface environment.

FIG. 10 is a block diagram of another example media menu interface environment 303. In this example implementation, the highlight indicator 324 is stationary, and the media menu items 310-322 vertically wrap in an up or down direction in response to a command to change a highlighted media menu item. The media menu items 330-342 likewise transition in a corresponding manner, similar to the transitions described with respect to FIG. 9 above. As shown in FIG. 10, the TV Shows media menu item 312 is highlighted, and thus the media menu item abstractions 332, 334, 336 and 338 are arranged in the foreground and background positions as indicated. The remaining media menu item abstractions 340, 342 and 330 can emerge into the media menu interface environment 303 in corresponding order, depending on the direction in which the media menu items 310-322 are scrolled.

Figure 11:
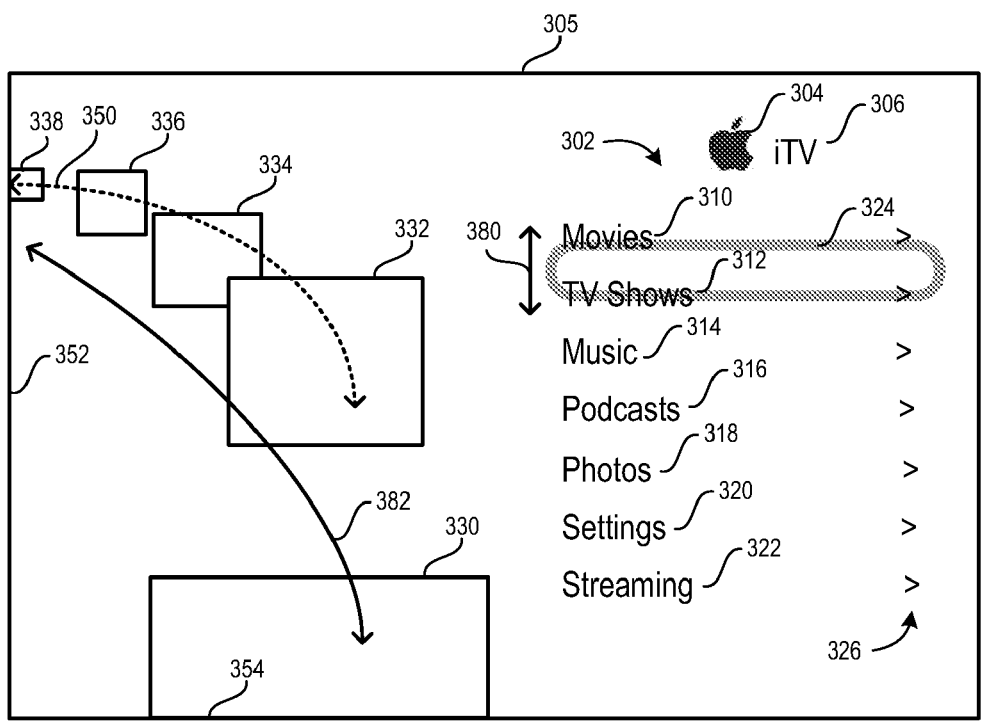
FIG. 11 is a block diagram of another example transition of media menu item abstractions in the media menu interface environment.

FIG. 11 is a block diagram of another example media menu interface environment 305. The example implementation of FIG. 11 can transition the media menu item abstractions 330-342 in a similar manner as described with reference to FIGS. 4-9, however, the media menu item abstractions 330-342 transition out the menu interface environment 305 through another edge 354.

Other processes can be implemented to illustrate a transition of a media menu item abstraction out of the media menu interface environment. For example, in one implementation, a media menu item abstraction is increased in size and fades out, simulating an effect of vertically launching from the media menu interface environment. In another implementation, a media menu item abstractions follows a straight path, or a linear path, from the foreground position out of the media menu interface environment. Other visual effects can also be used.

Figure 12:
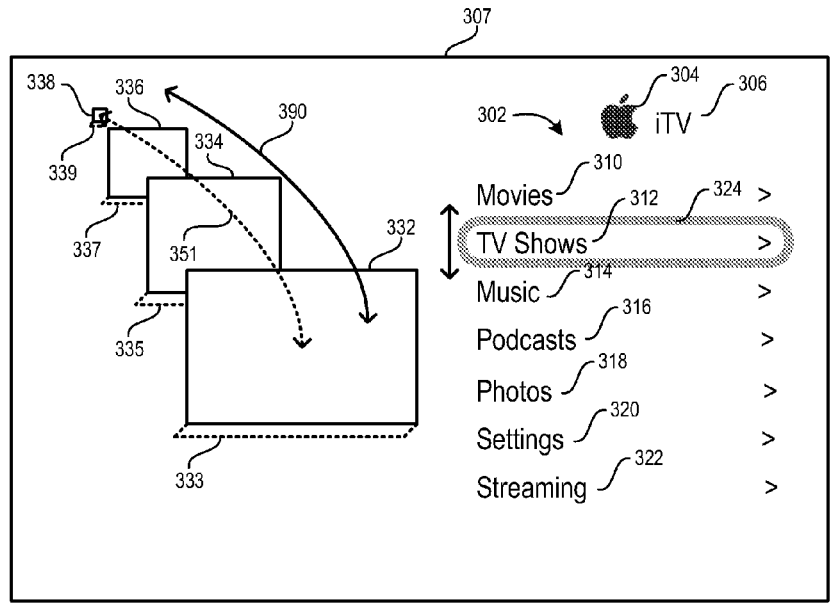
FIG. 12 is a block diagram of another example media menu interface environment.

FIG. 12 is a block diagram of another example media menu interface environment 307. In the example media menu interface environment 307, the media menu item abstractions are arranged in foreground and background positions, and one of the background positions is near a terminus of a multidimensional path 351. The terminus is defined by a vanishing point, and the media menu item abstractions emerge into the media menu interface environment 307 from the vanishing point when the media menu item abstractions are transitioning from the background positions into the foreground positions, and transition out of the menu interface environment 307 at the vanishing point when the media menu item abstractions are transitioning from the foreground position into the background positions, as indicated by directional arrow 390.

In another implementation, the media menu item abstractions can include a reflection effect. For example, the media menu item abstractions 332, 334, 336 and 338 include reflections 333, 335, 337 and 339. The reflection effect further emphasizes a multidimensional visual effect, and can be implemented in any of the implementations described herein.

In another implementation, the number of media menu item abstractions displayed along the multidimensional path 350 or the size of the display environment can vary depending on the size of the media menu item abstractions. For example, the media processing system 100 may normally display four media menu item abstractions; however, if the media menu item abstractions are increased or decreased in display size, the number of media menu item abstractions to be displayed can be decreased or increased, respectively.

In the example implementations described above, the transitioning of the media menu item abstractions corresponds to the transitioning of the highlight indicator 324, e.g., as the highlight indicator 324 transitions from one media menu item to the next, the media menu item abstractions likewise transition through the multidimensional path 350 in a substantially synchronous manner.

In another implementation, the media menu item abstractions do not transition until the highlight indicator 324 has settled on a media menu item and no further commands to transition the highlight indicator 324 are received. In yet another implementation, the media menu item abstractions and the highlight indicator 324 transition substantially instantaneously, e.g., within several video frames or within one video frame. Other transition animations may also be used.

Figure 13:
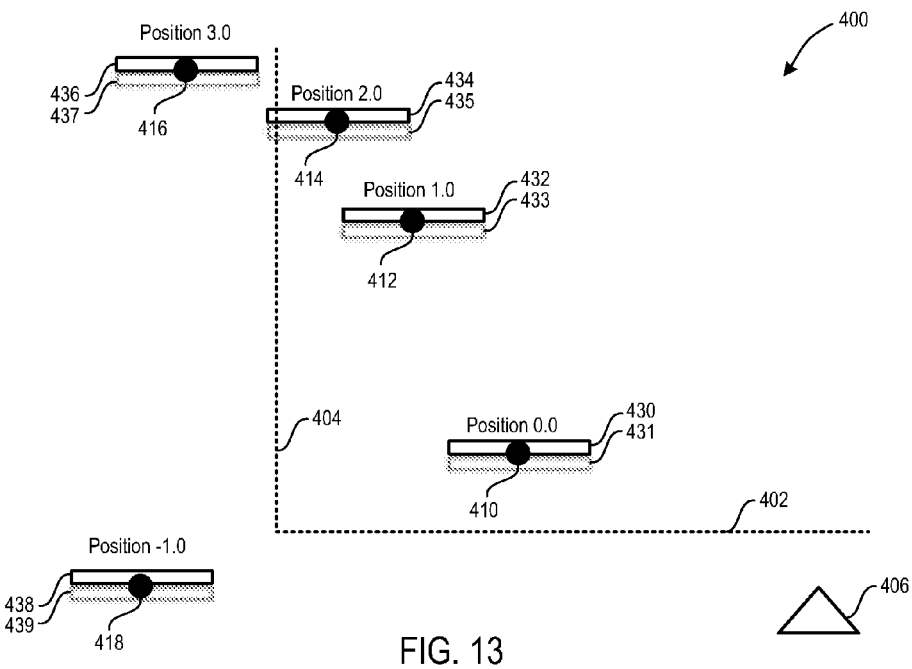
FIG. 13 is a block diagram of an example abstraction of images rendered in a multidimensional environment.

FIG. 13 is a block diagram of an example abstraction of images rendered in a multidimensional environment 400. The perspective of FIG. 13 is a top view of the multidimensional environment 400, e.g., a top view of a three-dimensional space. An x-axis 402 defines a front plane and a z-axis 404 defines side plane in the multidimensional environment 400. The plane of the x-axis 402 can, for example, be a viewing surface of a user interface as viewed from a camera 406 perspective.

A series of positions 410, 412, 414, 416 and 418 define a multidimensional path. In the multidimensional environment 400, the position 410 is a foreground position and the position 414 is a terminus position. The positions 416 and 418 are extra-dimensional positions, e.g., positions outside of the multidimensional environment 400 rendered on a display, and are defined by one or more spatial functions that determine the multidimensional coordinates of the positions 410-418. Additional positions can also be included, either within or outside the multidimensional environment 400.

In one implementation, media menu item abstractions can be displayed within a user interface environment at positions defined by positions 410, 412, and 414. For example, three of the media menu item abstractions 330-342 can be displayed at positions 410, 412 and 414. The media menu item abstractions can transition between the positions 410-414 as described above.

In one implementation, the media menu item abstractions can be displayed with an image artifact, such as a blurring effect. In one implementation, the media menu item abstractions are progressively blurred to a degree substantially or functionally proportional to the proximity of the media menu item abstractions to the foreground position 410.

In one implementation, the media menu item abstractions comprise images loaded from one or more image files, and the progressive blur is calculated for each transition between positions 410-412. For example, a Gaussian blur filter can be used to calculate the progressive blurs.

Calculating the progressive blurs for each transition, however, can consume significant processing resources for each calculation. Thus, in another implementation, a plurality of images to be used as the media menu item abstractions are received at an instantiation of the media processing system 100. The plurality of images can be retrieved from storage in the data store 102, for example, or received from the network over the I/O device 106, for example. Upon receipt of the images, blurred versions of the images are generated using a blur routine, such as a Gaussian blur filter, and the blurred version of each image is stored as a blurred image file. For example, as shown in FIG. 13, images 430, 432, 434, 436 and 438 are associated with positions 410, 412, 414, 416 and 418, respectively, such as in a data structure. Additionally, the blurred images 431, 433, 435, 437 and 439, which are corresponding blurred versions of the images 430, 432, 434, 436 and 438, are likewise associated with positions 410, 412, 414, 416 and 418, respectively.

During display processing, the displayed images 430, 432 and 434 the corresponding blurred images 431, 433 and 435 can, for example, be concurrently displayed in the same corresponding positions. An opacity value of each displayed image 430, 432 and 434 and/or each blurred image 431, 433 and 435 may be adjusted to generate a blur effect. The opacity value determines the degree of opacity of an image; images with high opacity values are less transparent than image with low opacity values. For example, the blur effect for the image 434 at position 414 can be maximized by maximizing the opacity value of the blurred image 435, and/or by minimizing the opacity value of the image 434. Likewise, the blur effect for the image 430 at position 410 can be minimized by minimizing the opacity value of the blurred image 431, and/or by maximizing the opacity value of the image 430. As the images and blurred images 430-439 transitions between the background and foreground positions 410, 412, and 414, the opacity values are adjusted accordingly to generate corresponding blur effects. Adjusting the opacity value of the displayed images 430, 432 and 434 and the corresponding blurred images 431, 433 and 435 requires fewer processing resources than regenerating the progressing blurs using a blur filter for each transition.

In another implementation, transparency values for the images and blurred images can be adjusted to generate the blur effect.

In another implementation, both the images and the blurred images to be used as the media menu item abstractions are received at an instantiation of the media processing system 100. This implementation facilitates a faster instantiation, as the processing-intensive process of generating blurred images need not be instantiated upon instantiation of the media processing system 100.

The concurrent display of an image, e.g., image 430, and a correspond blurred image, e.g., image 431 can, for example, be implemented by displaying the blurred images 431, 433 and 435 on a top layer, and displaying the images 430, 432, and 434 on a bottom layer. Alternatively, the blurred images 431, 433 and 435 can be displayed on the bottom layer, and the images 430, 432, and 434 can be displayed on the top layer.

In another implementation, the blur effect can be generated by a cross-fade between an image and a corresponding blurred image. For example, if a 30% blur is required for the media menu item abstraction at location 412, the image 432 can be drawn at the position 412 first with an opacity value of 70%, and the blurred image 433 can then be drawn at the position 412 with an opacity value of 30%. In this example implementation, the opacity values of an image, e.g., image 432, and a corresponding blurred image, e.g., image 433, are linearly proportional, e.g., 30%/70%, 40%/60%, etc. Other functions of substantially linear proportionalities and nonlinear proportionalities can also be used.

Figure 14:
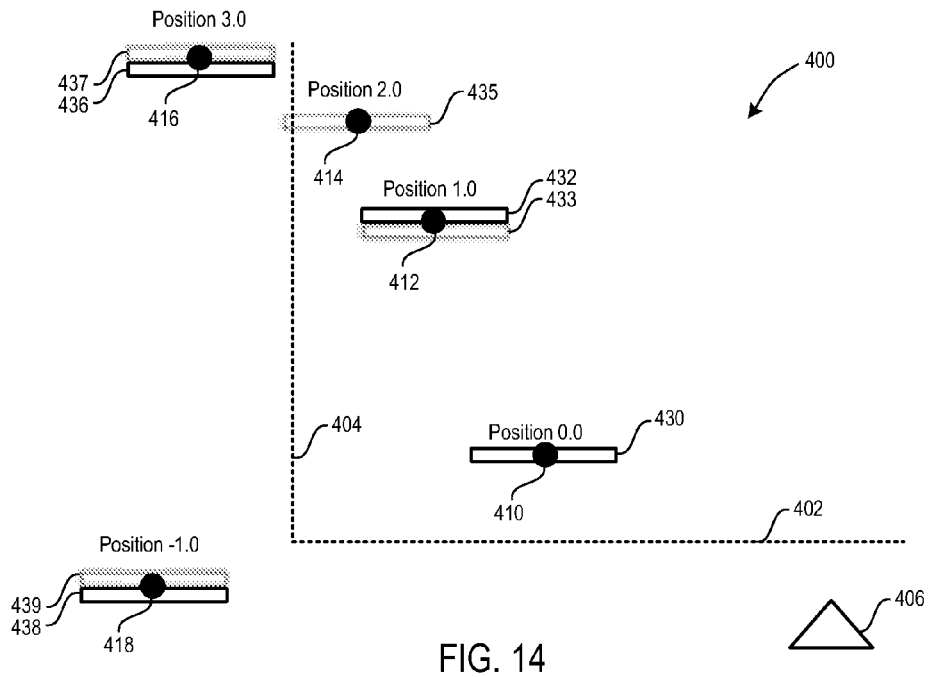
FIG. 14 is a block diagram of another example abstraction of images rendered in the multidimensional environment.

FIG. 14 is a block diagram of another example abstraction of images rendered in the multidimensional environment 400. The example abstraction of FIG. 14 can, for example, correspond to another implementation in which only a blurred image, e.g., blurred image 435 in position 414, is displayed for a maximum blur effect, e.g., a 100% blur. Additionally, only an image, e.g., image 430 in position 410, is displayed for a minimum blur effect, e.g., a 0% blur.

Figure 15:
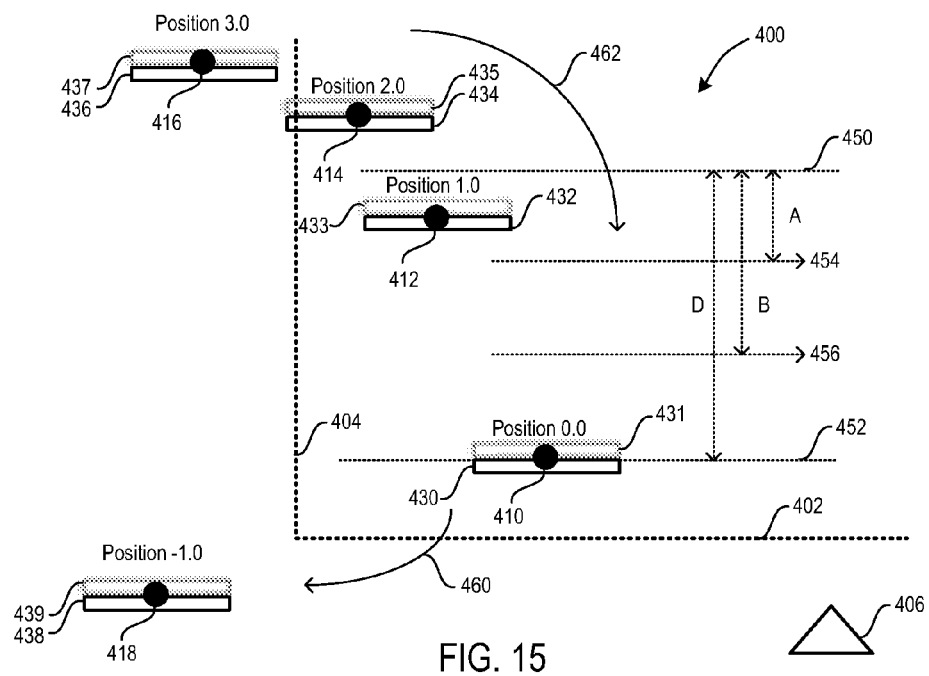
FIG. 15 is a block diagram of another example abstraction of images rendered in the multidimensional environment.

FIG. 15 is a block diagram of another example abstraction of images rendered in the multidimensional environment 400. The example abstraction of FIG. 15 is similar to the example abstraction of FIG. 13, except that the concurrent display of images and corresponding blurred images is implemented by displaying the blurred images 431, 433 and 435 on a bottom layer, and displaying the images 430, 432, and 434 on a top layer. Alternatively, the blur effect may be generated by first drawing a blurred image having an opacity value at a position, e.g. the blurred image 433 can be drawn at the position 412 with an opacity value of 30%, and then drawing the image having an opacity value at the position, e.g., drawing the image 432 at the position 412 with an opacity value of 70%.

In another implementation, the opacity values for an image and corresponding blurred image are adjusted as the image and corresponding blurred image transition through the positions 410, 412 and 414. For example, in an initial state as shown in FIG. 15, the blur effect in the terminus position 414 is maximized, e.g., the image 434 and blurred image 435 opacity values are 0% and 100%, respectively. Conversely, the blur effect in the foreground position 410 is minimized, e.g., the image 430 and blurred image 431 opacity value are 100% and 0%, respectively.

During a transition of media menu abstractions from the background positions to the foreground positions, e.g., upon changing the highlight indicator 324 from media menu item 310 to media menu item 312 of FIG. 4, for example, the image 430 and blurred image 431 transition out of the multidimensional environment 400, as indicated by directional arrow 460. Likewise, the image 432 and the blurred image 433 transition into the foreground position 410; the image 434 and the blurred image 435 transition into the background position 412; and the image 436 and the blurred image 437 transition into the background terminus position 414, as indicated by the directional arrow 462.

Upon the transition of the image 434 and the blurred image 435 through a first spatial demarcation 450, the corresponding opacity values of the image 434 and the blurred image 435 are adjusted based on the position of the image 434 and the blurred image 435 from a second spatial demarcation 452. In one implementation, the first spatial demarcation 450 is located between the terminus position and an adjacent background position, e.g., between positions 414 and 412, and the second spatial demarcation 452 is located substantially coincident with the foreground position 410. Other locations for the first and second spatial demarcations 450 and 452 may also be used.

The first and second spatial demarcations define a distance D. In one implementation, the opacity values of an image and a corresponding blurred image are adjusted in substantially linear portion to their current position along the z-axis 404 between the first and second spatial demarcations 450 and 452. For example, at a z-coordinate less than D, e.g., z<0, the image opacity value is set to 100% and the blurred image opacity value is set to 0%. At a z-coordinate less than D but greater than 0, the opacity values are adjusted according to a ratio of the z-coordinate value and the distance D. For example, at the z-coordinate D-A defined by the line 454, the image opacity value is adjusted to 32% and the blurred image opacity value is adjusted to 68%; as the image and blurred image transition to the foreground position, the opacity values are likewise adjusted, e.g., at the z-coordinate D-B, defined by the line 456 the image opacity value is adjusted to 65% and the blurred image opacity value is adjusted to 35%. At a z-coordinate greater than D, e.g., at position 414, the image opacity value is set to 0% and the blurred image opacity value is set to 100%.

Other opacity value adjustments algorithms may also be used. For example, the opacity values of the images and blurred images may be adjusted according to a non-linear relationship, etc. In another implementation, the opacity value of only the image in a top layer may be adjusted.

In one implementation, each position can be assigned a numeric value to facilitate one or more processing algorithms, e.g., −1.0, 0.0, 1.0, 2.2 and 3.0 for positions 418, 410, 412, 414 and 416, respectively. In general, given a number n for the number of positions defining the multidimensional path, the values for the positions can range from −n-1.0 to n-1.0. For example, Table 1 shows position assignments in the menu interface environment 300 of FIG. 4:

TABLE 1

| Position | Menu Item Abstraction |
|---|---|
| 0.0 | Movies |
| 1.0 | TV Shows |
| 2.0 | Music |
| 3.0 | Podcasts |
| 4.0 | Photos |
| 5.0 | Settings |
| 6.0 | Streaming |

However, if the media menu item 324 were to highlight the media menu item 318, corresponding to the Photos media menu item abstraction 340, then the position assignments would be as shown in Table 2 below:

TABLE 2

| Position | Menu Item Abstraction |
|---|---|
| −4.0 | Movies |
| −3.0 | TV Shows |
| −2.0 | Music |
| −1.0 | Podcasts |
| 0.0 | Photos |
| 1.0 | Settings |
| 2.0 | Streaming |

As shown in FIGS. 4-15 above, the media menu item abstractions transition in a multidimensional space, e.g., a three-dimensional space. The numeric values assigned to each position, e.g. positions 410, 412, 416 and 418, govern the x, y and z translations of the media menu item abstractions. The media menu item abstractions are moved into intermediate positions between the positions 410, 412, 416 and 418 during translation. For example, when a translation is halfway complete, a media menu item abstraction is at position that is 0.5 greater than an original position and 0.5 less than a destination position.

In one implementation, a z-translation is determined by an accurate function, such as a parabolic equation. A parabolic function defines a multidimensional path in which the distances between the foreground position and subsequent background positions decrease nonlinearly. Accordingly, the translation rate of a media menu item abstraction increases near the foreground position and decrease near the terminus position. As the position value increases, e.g., 1.0 to 2.0, or 2.0 to 3.0 the difference between the respective z-translations between positions, e.g., positions 410, 412 and 414, decreases according to the following equations:

$$z\text{Rate} = -\text{sqrt}(2.0*P+S) + \text{sqrt}(S); \text{ and}$$

$$z\text{Translation} = z\text{Rate}*\text{max}Z$$

where "maxZ" is the maximum amount of z-translation available in the multidimensional environment 400, "P" is the position value at a point along the multidimensional path, "S" is a smoothing factor, and "sqrt" is a square root function.

Figure 16:
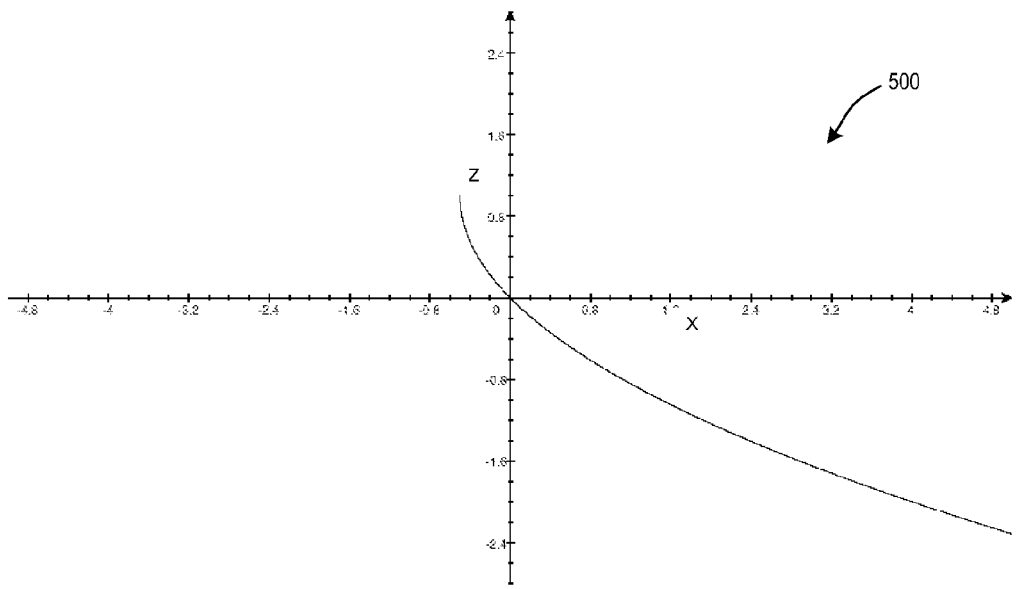
FIG. 16 is a graph of an example multidimensional path translation dependency.

FIG. 16 is a graph of an example multidimensional path translation dependency 500 based on the equation above. The parabolic graph is shifted from the origin due to the smoothing factor S. Normally, the slope of parabolic graph increases to infinity as the graph approaches the origin. Such an increase would result in abrupt movement of the media menu item abstractions. Thus, the smoothing factor S is provided to translate the graph so that the slope of the graph when crossing the origin is less steep. As a result, the movement of the media menu item abstractions is smoothed as the media menu item abstractions approach the positions 410, which has a position value of 0.0. In one implementation, the smooth factor is 1.0. Other smooth factor values may be used. Additionally, the smooth factor value need not be a fixed value, but can be based on one or more variables.

In one implementation, the y-translation is also calculated using the zRate. An example y-translation is calculated according to the following equation:

$$y\text{Translation} = \text{min}Y + (-z\text{Rate}*\text{max}Y)$$

where "maxY" and "minY" are the maximum and minimum amounts y-translation available in the multidimensional environment 400.

In one implementation, the x-translation is determined by a linear equation to generate a maximum translation at the origin of the x-axis. An example x-translation is calculated according to the following equation:

$$x\text{Translation} = \text{min}X - (\text{max}X*P)$$

where "maxX" and "minX" are the maximum and minimum amounts x-translation available in the multidimensional environment 400.

In one implementation, the y-translation and z-translation equations are adjusted for media menu item abstractions transitioning into negative positions, e.g., position 418, having a position value of −1.0. In one implementation, to simulate the "fly by" effect, e.g., moving the media menu item abstractions off the screen quickly while maintaining a distance from the camera 406 perspective, the movement in the y- and z-axis, can, for example, becomes linear rather than parabolic. Thus, when the position values of corresponding positions become negative, e.g., during the translation from position 410 to position 418, the y-translation and z-translation are governed by the respective equations:

$$z\text{Translation} = -P*C1; \text{ and}$$

$$y\text{Translation} = \text{min}Y + (\text{max}Y*P/C2)$$

where "C1" and "C2" are constants. In one implementation, the constant C1 is selected to cause the media menu item abstraction to translate across the z-axis gradually, and the constant C1 causes the media menu item abstraction to translate across the y-axis gradually.

Other spatial functions may be used to determine the x-, y- and z-axis translations other than those described above. For example, in one implementation, when transitioning into a negative position, e.g., a position having a position value of −1, a linear path in which x and y remain constant and in which the z-translation increases is used to generate the effect that the media menu item abstraction in the foreground position 410 "launches" out of the multidimensional environment 400. Alternatively, in another implementation, the media menu item abstractions can exit the multidimensional environment 400 along the same or similar multidimensional path common to the positions 410, 412, and 414. Other effects and multidimensional paths can also be used.

Figure 17:
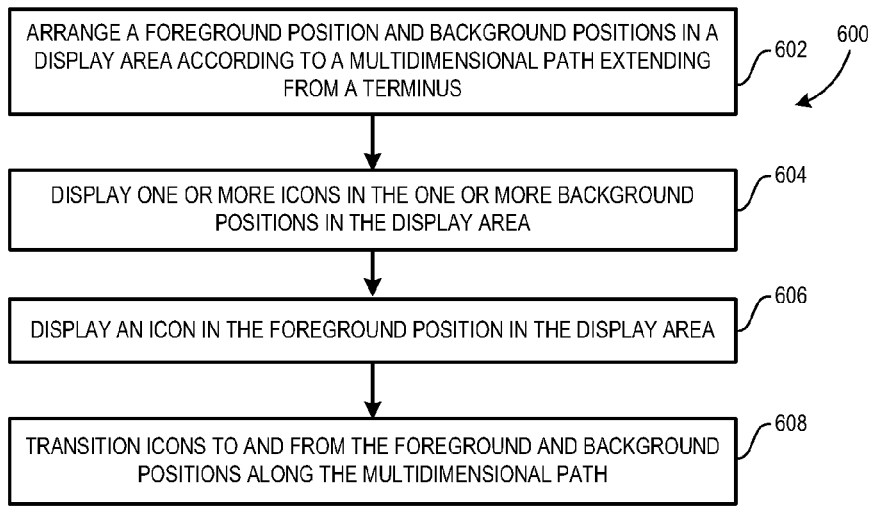
FIG. 17 is a flow diagram of an example icon display process.

FIG. 17 is a flow diagram of an example icon display process 600. In one example implementation, the processing device 104 and/or UI engine 114 can perform operations to implement the process 600.

Stage 602 arranges a foreground position and background positions in a display area according to a multidimensional path extending from a terminus. For example, the processing device 104 and/or UI engine 114 can arrange the media menu item abstractions according to the multidimensional path 350 of FIG. 4 or the multidimensional path 351 of FIG. 12.

Stage 604 displays one or more icons in the one or more background positions in the display area. For example, the processing device 104 and/or UI engine 114 can display one or more media menu item abstractions in one or more background positions.

Stage 606 displays an icon in the foreground position in the display area. For example, the processing device 104 and/or UI engine 114 can display one or more media menu item abstractions, e.g., media icons in foreground positions.

Stage 608 transitions icons from the foreground and background positions along the multidimensional path. For example, the processing device 104 and/or UI engine 114 can transition the media menu item abstractions as described with reference to FIGS. 4-12 above.

Figure 18:
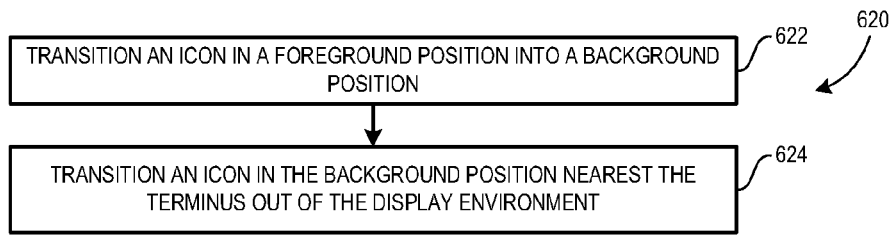
FIG. 18 is a flow diagrams of an example icon transition process.

FIG. 18 is a flow diagram of an example icon transition process 620. In one example implementation, the processing device 104 and/or UI engine 114 can perform operations to implement the process 620.

Stage 622 transitions an icon in the foreground position into a background position. For example, the processing device 104 and/or UI engine 114 can transition a media menu item abstraction from a foreground position to a background position.

Stage 624 transitions an icon in the background position nearest the terminus of the multidimensional path out of the display environment. For example, the processing device 104 and/or UI engine 114 can transition media menu item abstractions in the terminus position out of the display environment.

Figure 19:
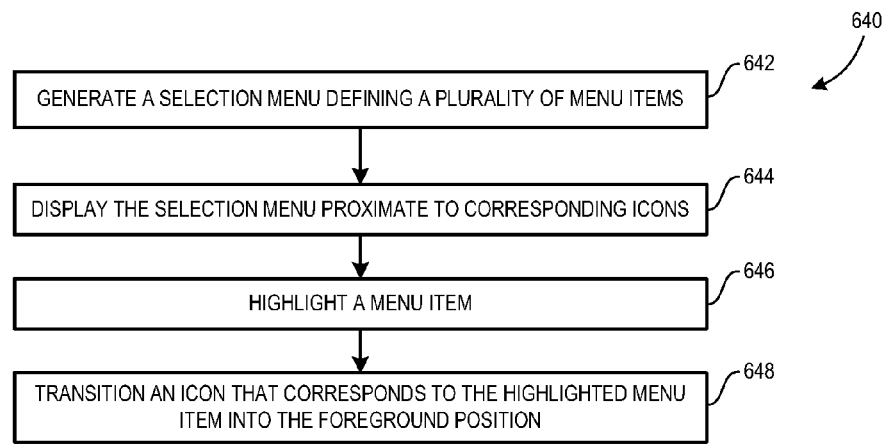
FIG. 19 is a flow diagram of another example icon transition process.

FIG. 19 is a flow diagram of another example icon transition process 640. In one example implementation, the processing device 104 and/or UI engine 114 can perform operations to implement the process 640.

Stage 642 generates a selection menu defining a plurality of menu items. For example, the processing device 104 and/or UI engine 114 can generate the media menu 302 and media menu items 310-322.

Stage 644 displays the selection menu proximate to corresponding icons. For example, the processing device 104 and/or UI engine 114 can display the media menu 302 proximate to the media menu item abstractions 330-342.

Stage 646 highlights a menu item. For example, the processing device 104 and/or UI engine 114 can generate the highlight indicator 324 to highlight a menu item.

Stage 648 transitions an icon that corresponds to the highlighted menu item into the foreground position. For example, the processing device 104 and/or UI engine 114 can transition a media menu item abstraction into the foreground position.

Figure 20:
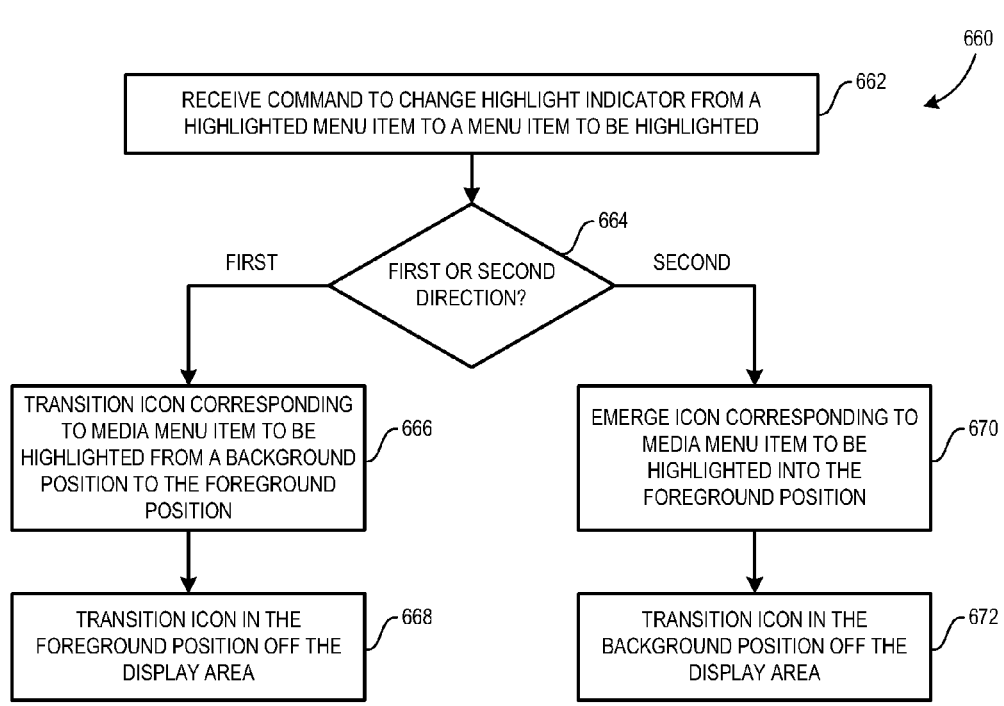
FIG. 20 is a flow diagram of another example icon transition process.

FIG. 20 is a flow diagram of another example icon transition process 660. In one example implementation, the processing device 104 and/or UI engine 114 can perform operations to implement the process 660.

Stage 662 receives a command to change the highlight indicator from a highlighted menu item to a menu item to be highlighted. For example, the processing device 104 and/or UI engine 114 can receive a command to change the highlight indicator 324 from a highlighted media menu item to a media menu item to be highlighted.

Stage 664 determines if the direction of the highlight indicator during transition is in a first direction or a second direction. For example, the processing device 104 and/or UI engine 114 can determine if the highlight indicator 324 is transitioning in an up direction or a down direction. While an example two direction method is described, other multi-directional methods for traversing more or less complicated paths can be used.

If the direction is in the first direction, stage 666 transitions the icon corresponding to the media menu item to be highlighted from a background position to the foreground position. For example, the processing device 104 and/or UI engine 114 can transition a media menu item abstraction from a background position to a foreground position.

If the direction is in the first direction, stage 668 transitions the highlighted icon in the foreground position off the display area. For example, the processing device 104 and/or UI engine 114 can transition a highlighted media menu item abstraction off the media menu interface environment 300.

If the direction is in the second direction, stage 670 emerges the icon corresponding to the media menu item to be highlighted into the foreground position. For example, the processing device 104 and/or UI engine 114 can emerge a media menu item abstraction into the foreground position.

If the direction is in the second direction, stage 672 transitions an icon in the background position off the display area. For example, the processing device 104 and/or UI engine 114 can transition a media menu item abstraction in the terminus position off the media menu interface environment 300.

Figure 21:
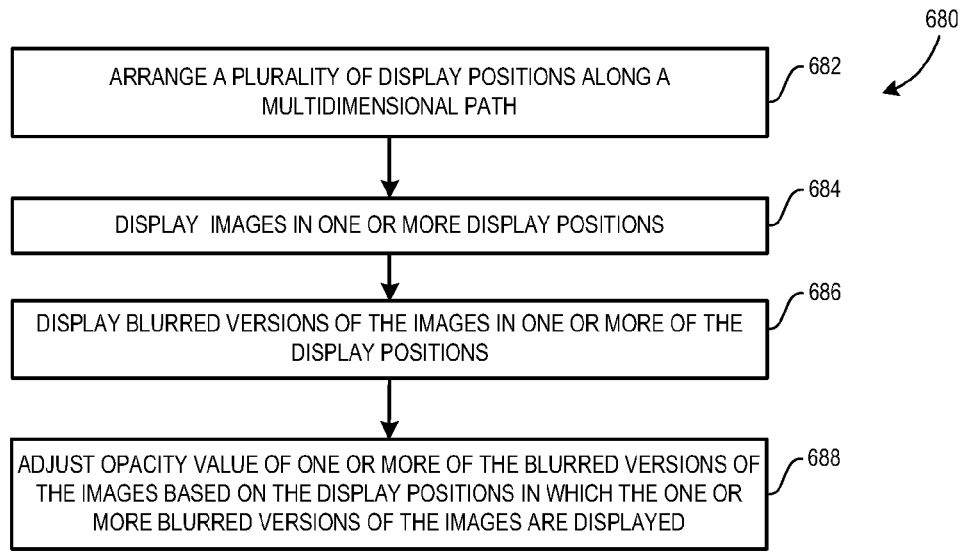
FIG. 21 is a flow diagram of an example multidimensional path image rendering process.

FIG. 21 is a flow diagram of an example multidimensional path image rendering process 680. In one example implementation, the processing device 104 and/or UI engine 114 can perform operations to implement the process 680.

Stage 682 arranges a plurality of display positions along a multidimensional path. For example, the processing device 104 and/or UI engine 114 can arrange positions −n-1.0 to n-1.0 along a multidimensional path, where n is the number of media menu item abstractions, images, or other graphical data to be rendered.

Stage 684 displays images in one or more display positions. For example, the processing device 104 and/or UI engine 114 can display images 430, 432 and 434 in the display positions 410, 412 and 414 of FIG. 13.

Stage 686 displays blurred versions of the images in one or more of the display positions. For example, the processing device 104 and/or UI engine 114 can display blurred images 431, 433 and 435 in the display positions 410, 412 and 414 of FIG. 13.

Stage 688 adjusts opacity values of one or more of the blurred versions of the images based on the display positions in which the one or more blurred versions of the images are displayed. For example, in FIG. 13, the processing device 104 and/or UI engine 114 can adjust the opacity value of the blurred image 435 to a maximum value, and adjust the opacity value of the blurred image 433 to an intermediate value, and adjust the opacity value of the blurred image 431 to a minimum value.

Figure 22:
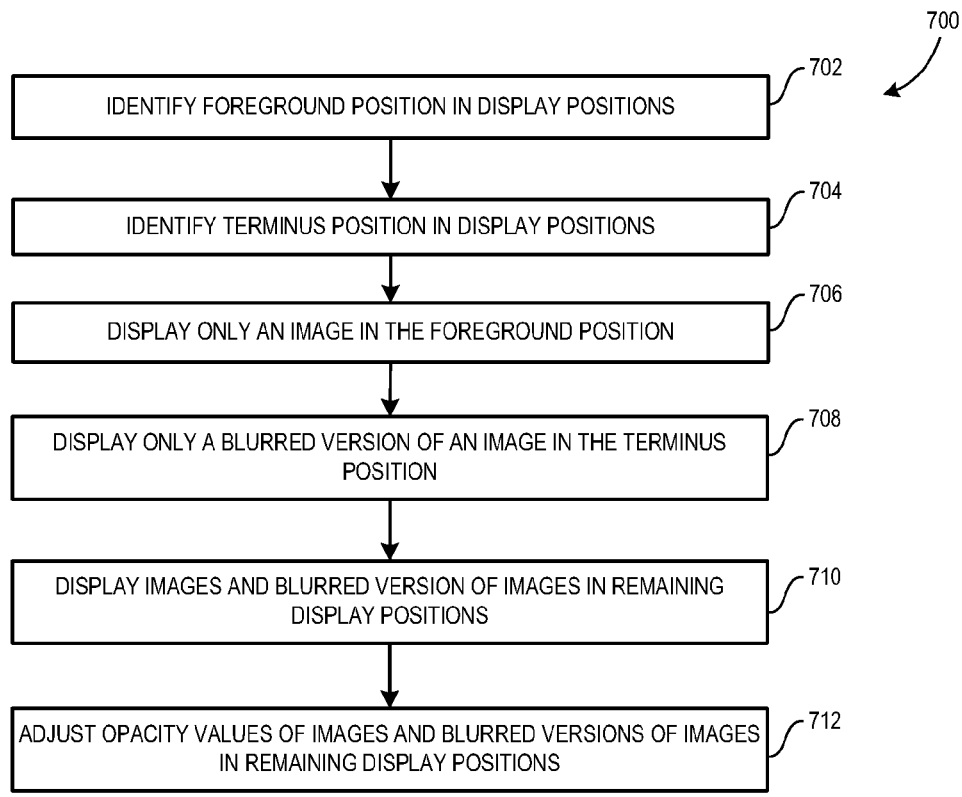
FIG. 22 is a flow diagram of another example multidimensional path image rendering process.

FIG. 22 is a flow diagram of another example multidimensional path image rendering process 700. In one example implementation, the processing device 104 and/or UI engine 114 can perform operations to implement the process 700.

Stage 702 identifies a foreground position in the display positions. For example, the processing device 104 and/or UI engine 114 can identify the position 410 of FIG. 14 as a foreground position.

Stage 704 identifies a terminus position in the display positions. For example, the processing device 104 and/or UI engine 114 can identify the position 414 of FIG. 14 as a terminus position.

Stage 706 displays only an image in the foreground position. For example, the processing device 104 and/or UI engine 114 can display only the image 430 in the foreground position 410, and not display the corresponding blurred image 431 in the foreground position 430, as shown in FIG. 14.

Stage 708 displays only a blurred image in the terminus position. For example, the processing device 104 and/or UI engine 114 can display only the blurred image 435 in the terminus position 414, and not display the corresponding image 434 in the terminus position 414, as shown in FIG. 14.

Stage 710 displays images and blurred images in the remaining display positions. For example, the processing device 104 and/or UI engine 114 can display the image 432 and corresponding blurred image 433 in the position 412 in FIG. 14.

Stage 712 adjusts the opacity values of the images and the blurred images displayed in the remaining display positions. For example, the processing device 104 and/or UI engine 114 can adjust the opacity value of one or both of the image 432 and the corresponding blurred image 433 displayed in the position 412 of FIG. 14. The adjustment of the opacity values can be performed before the display of the images in the respective positions.

Figure 23:
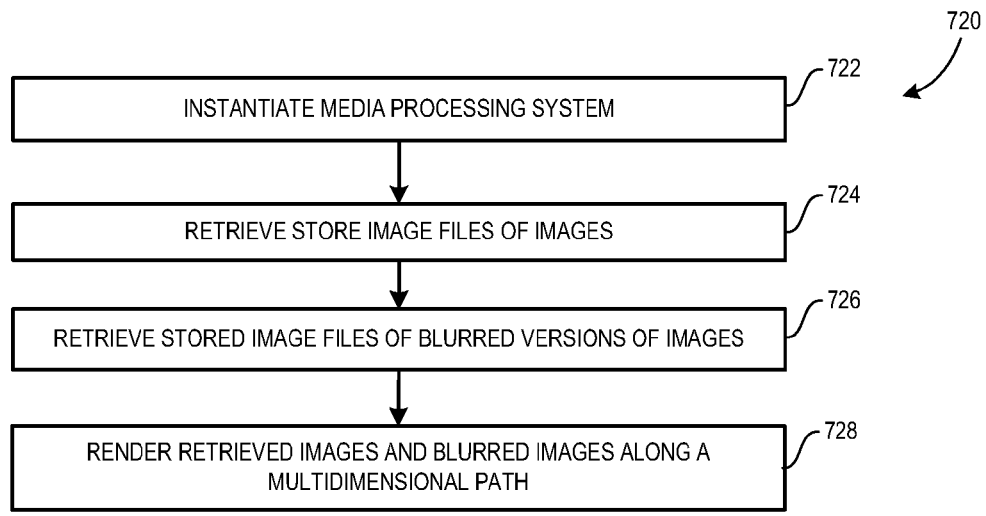
FIG. 23 is a flow diagram of an example image generation process.

FIG. 23 is a flow diagram of an example image generation process 720. In one example implementation, the processing device 104 and/or UI engine 114 can perform operations to implement the process 720.

Stage 722 instantiates a media processing system. For example, the processing device 104 can instantiate the UI engine 114 of the media processing system 100 of FIG. 1.

Stage 724 retrieves stored image files of images. For example, the processing device 104 and/or UI engine 114 can retrieve stored image files from a data store, such as data store 102 of FIG. 1.

Stage 726 retrieves stored image files of blurred versions of the images. For example, the processing device 104 and/or UI engine 114 can retrieve blurred image files from a data store, such as the data store 102 of FIG. 1.

Stage 728 renders the retrieved images along a multidimensional path. For example, the processing device 104 and/or UI engine 114 can render the retrieved images and the blurred images along a multidimensional path, such as the paths 350 of FIG. 4, or 351 of FIG. 12, or the multidimensional path defined by the positions 410, 412 and 414 of FIG. 13.

Figure 24:
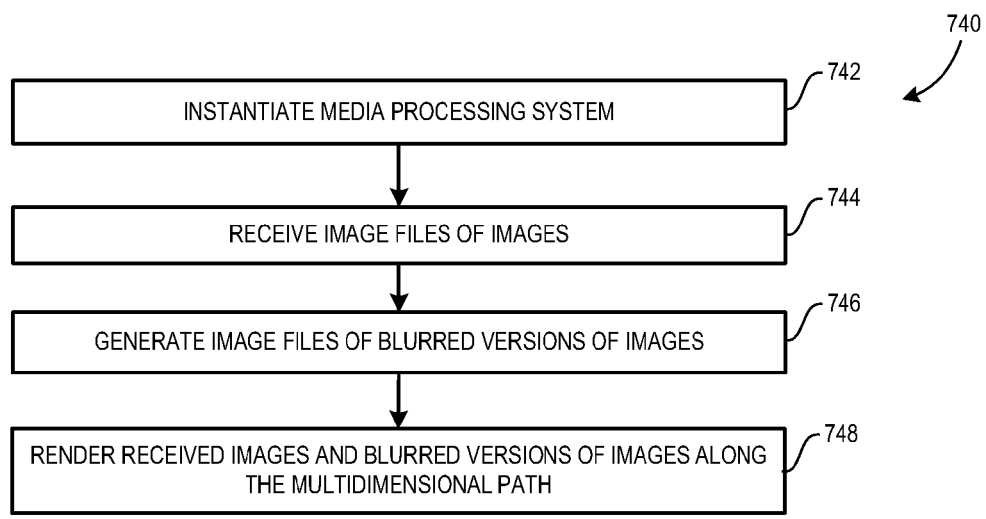
FIG. 24 is a flow diagram of another example image generation process.

FIG. 24 is a flow diagram of another example image generation process 740. In one example implementation, the processing device 104 and/or UI engine 114, I/O device 106, and one or more media engines 116 can perform operations to implement the process 740.

Stage 742 instantiates a media processing system. For example, the processing device 104 can instantiate the UI engine 114 of the media processing system 100 of FIG. 1.

Stage 744 receives image files of images. For example, the processing device 104 and/or UI engine 114 can receive image files retrieved from the data store 102, or can receive image files from a network, such as the network 202, through the I/O device 106.

Stage 746 generates image files of blurred versions of the images received in stage 744. For example, the processing device 104 and/or a corresponding media engine 116 can generate blurred versions of the image files received from the data store 102 or over the network 202. In one implementation, the image files can be generated by a Gaussian blur filter.

Stage 748 renders the received images and the blurred images along a multidimensional path. For example, the processing device 104 and/or UI engine 114 can render the retrieved images and the blurred images along a multidimensional path, such as the paths 350 of FIG. 4, or 351 of FIG. 12, or the multidimensional path defined by the positions 410, 412 and 414 of FIG. 13.

The stages recited in the example processes of FIGS. 17-22 need not be performed in the example orders set forth. For example, in one implementation of the image rendering process 680, the opacity values of the blurred images are determined before the blurred images are displayed. In another implementation, the opacity values of the blurred images are determined after the blurred images are displayed. By way of another example, in one implementation of the image rendering process 700, the images and the blurred versions of the images may be generated first at the terminus position, then at the remaining background positions, and then at the foreground position. Other orders of image and blurred image generation can also be used.

Figure 25:
FIGS. 25-28 are screenshots of another example media menu interface environment.
Figure 26:
Figure 27:
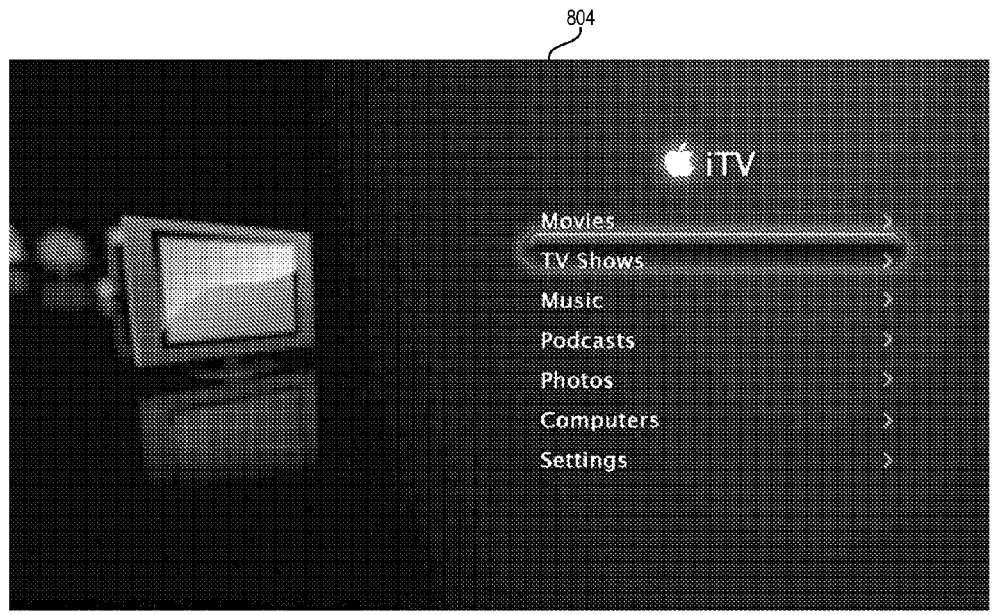

FIGS. 25-28 are screenshots of another example media menu interface environment. The screenshot 802 of FIG. 25 shows the "Movies" menu item highlighted by a highlight indicator. A corresponding Movie icon is displayed in a foreground position, and other menu-related icons are blurred in the background positions. Each displayed icon also has a reflection depicted as shown in FIGS. 25-28, and as described with reference to reflections 333, 335, 337 and 339 described above.

The screenshots 802 and 804 of FIGS. 18 and 19 show two separate frames during a transition of the highlight indicator from the "Movies" menu item to the "TV Shows" menu item. As the highlight indicator transitions, the Movie icon transitions off the edge of the interface environment, and the background icons transition in a forward direction, with the TV Shows icon transitioning into the foreground position.

Figure 28:
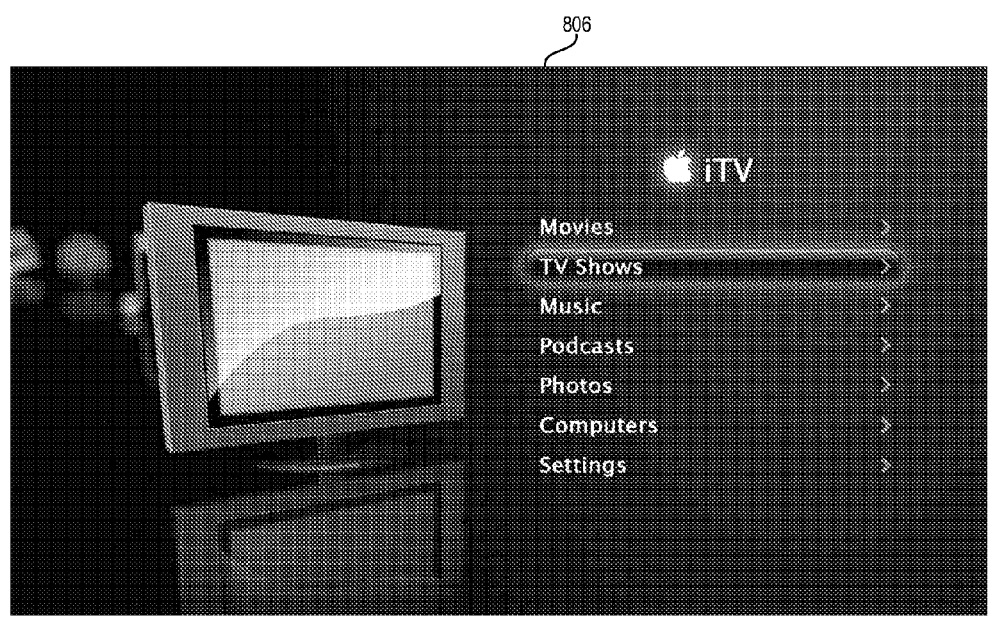

The screenshot 808 of FIG. 28 shows the end result of the transition. The "TV shows" menu item highlighted by a highlight indicator and the corresponding TV Shows icon is displayed in the foreground position.

In another implementation, only one media menu item abstraction is shown in the foreground position, and additional media menu item abstractions are not shown in the background position. In this implementation, the media menu item abstractions that to do not correspond to the highlighted menu item transition off the display area through the multidimensional path as described above, e.g., through the terminus position if transitioning into the background position, or by being displaced by a media menu item abstraction emerging into the terminus position and transitioning from the background into the foreground position. Accordingly, only the media menu item abstraction corresponding to the highlighted menu item is shown.

In another implementation, other images are displayed in the same manner that the media menu item abstractions are displayed. For example, image files, such as personal photos, may be viewed using the translation and blurring techniques described above. Alternatively, a file structure, such as folder contents, can be perused using the techniques described above.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described herein, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
arranging a plurality of display positions along a multidimensional path;
displaying images in the plurality of display positions;
concurrently displaying blurred versions of the images in the plurality of display positions so that each blurred version of an image and the image to which the blurred version of the image corresponds overlay each other;
adjusting an opacity value for each of the blurred versions of the images based on the display positions in which each of the blurred versions of the images is displayed; and
adjusting an opacity value of each of the images based on the display positions in which each of the images is displayed;
wherein the adjustment of the opacity value of each of the blurred versions of the images is in inverse proportion to the adjustment of the opacity value of the image to which the blurred version of the image corresponds.

2. The method of claim 1, comprising:
identifying a foreground position in the display positions; and
adjusting an opacity value of a blurred version of an image displayed in the foreground position to a first predetermined value; and
adjusting an opacity value of an image displayed in the foreground position and corresponding to the blurred version of the image to a second predetermined value that is inversely proportional to the predetermined value.

3. The method of claim 2, wherein:
the first predetermined value for the blurred version of the image is a minimum value so that the blurred version of the image is fully transparent; and
the second predetermined value for the image is a maximum value so that the image is fully opaque.

4. The method of claim 2, comprising:
identifying a terminus position in the display positions; and
adjusting an opacity value of a blurred version of an image displayed in the terminus position to a third predetermined value; and
adjusting an opacity value of an image displayed in the terminus position and corresponding to the blurred version of the image to a fourth predetermined value that is inversely proportional to the third predetermined value.

5. The method of claim 4, wherein:
the third predetermined value for the blurred version of the image is a maximum value so that the blurred version of the image is fully opaque; and
the fourth predetermined value for the image is a minimum value so that the image is fully transparent.

6. The method of claim 4, comprising:
identifying one or more background positions in the display positions; and
adjusting the opacity values of the blurred versions of images displayed in the background positions to values ranging from the first predetermined value to the third predetermined value.

7. The method of claim 4, wherein:
identifying a foreground position in the display positions;
identifying one or more background positions in the display positions;
adjusting the opacity values of the blurred versions of images displayed in the background positions to values ranging from a substantially minimum value to a substantially maximum value; and
wherein:
the background positions are positioned along a path between the foreground position and the terminus position;
the opacity values of the blurred versions of the images displayed in the background positions are adjusted in proportion to a proximity of the background positions to the foreground position; and
wherein a blurred version of an image in the foreground position has the substantially minimum opacity value and a blurred version of an image in the terminus position has the substantially maximum opacity value so that the blurred version of the image displayed in the foreground position is substantially fully transparent and the blurred version of the image displayed in the terminus position is substantially fully opaque.

8. The method of claim 1, comprising:
identifying a foreground position in the display positions; and
adjusting an opacity value of an image displayed in the foreground position to a maximum value so that the image is fully opaque.

9. The method of claim 8, comprising:
identifying a terminus position in the display positions; and
adjusting an opacity value of an image displayed in the terminus position to a minimum value so that the image is fully transparent.

10. The method of claim 9, comprising:
identifying one or more background positions in the display positions; and
adjusting the opacity values of the images displayed in the background positions to values ranging from substantially the maximum value to substantially the minimum value so that the images displayed in the background positions range from substantially fully opaque to substantially fully transparent, respectively.

11. The method of claim 1, wherein the adjustment of the opacity value of each blurred version of an image is in substantially linearly inverse proportion to the adjustment of the opacity value of the image to which the blurred version of the image corresponds.

12. The method of claim 1, comprising:
identifying a foreground position in the display positions; and
adjusting an opacity value of the blurred versions of the images displayed in the display positions in proportion to a proximity of the display positions to the foreground position.

13. The method of claim 1, comprising:
defining one or more dimensions of the multidimensional path according to one or more spatial functions.

14. The method of claim 13, wherein:
the spatial function comprises an arcuate function.

15. The method of claim 1, comprising:
defining one or more dimensions of the multidimensional path according to one or more parabolic functions.

16. The method of claim 15, comprising:
translating the one or more of the parabolic functions away from one or more dimensional origins.

17. The method of claim 1, comprising:
scaling the size of the image and the blurred versions of the images displayed in the display positions based on the display positions in which the images and blurred versions of the images are displayed.

18. A computer readable memory device storing instructions that are executable by a processing device, and upon such execution cause the processing device to perform operations comprising:
generating an interface environment;
generating images and corresponding blurred versions of the images;
displaying one of the images in a foreground position in the interface environment;
concurrently displaying one or more of the images and corresponding blurred versions of the images in background positions in the interface environment so that each displayed image and the corresponding blurred version of that displayed image overlay each other in the background positions;
transitioning the images and the corresponding blurred versions of the images between the foreground position and the background positions; and
adjusting opacity values for the corresponding blurred versions of the images based on the positions at which the corresponding blurred versions of the images are displayed;
adjusting an opacity value of each of the images based on the display positions at which the corresponding images are displayed;
wherein the adjustment of the opacity value of each of the blurred versions of the images is in inverse proportion to the adjustment of the opacity value of the image to which the blurred version of the image corresponds.

19. The computer memory device medium of claim 18, storing further instructions that are executable by a processing device, and upon such execution cause the processing device to perform operations comprising:
identifying a terminus position in the background positions; and
adjusting an opacity value of a corresponding blurred version of an image displayed in the terminus position to a maximum value so that the corresponding blurred version of the image is fully opaque; and
adjusting an opacity value of an image displayed in the terminus position to a minimum value so that the image is fully transparent.

20. The computer readable memory device of claim 18, storing further instructions that are executable by a processing device, and upon such execution cause the processing device to perform operations comprising:
displaying a blurred version of the one of the images in the foreground position; and
adjusting the opacity value of the corresponding blurred version of the one of the images displayed in the foreground position to a minimum value so that the corresponding blurred version of the one of the images is fully transparent; and
adjusting an opacity value of an image displayed in the foreground position to a maximum value so that the image is fully opaque.

21. The computer readable memory device of claim 20, storing further instructions that are executable by a processing device, and upon such execution cause the processing device to perform operations comprising:
adjusting the opacity values of the corresponding blurred versions of the images displayed in the background positions to values ranging from substantially the maximum value to substantially the minimum value so that the corresponding blurred versions of the images displayed in the background positions range from substantially fully opaque to substantially fully transparent, respectively.

22. The computer readable memory device of claim 18, storing further instructions that are executable by a processing device, and upon such execution cause the processing device to perform operations comprising:
identifying a terminus position in the background positions; and
displaying only a corresponding blurred version of an image at the terminus position.

23. The computer readable memory device of claim 18, storing further instructions that are executable by a processing device, and upon such execution cause the processing device to perform operations comprising:
adjusting the opacity values of the corresponding blurred versions of the images displayed in the background positions to values ranging from substantially a minimum value to substantially a maximum value so that the corresponding blurred versions of the images displayed in the background positions range from substantially fully transparent to substantially fully opaque, respectively.

24. The computer readable memory device of claim 18, wherein the adjustment of the opacity value of each blurred version of an image is in substantially linearly inverse proportion to the adjustment of the opacity value of the image to which the blurred version of the image corresponds.

25. The computer readable memory device of claim 18, storing further instructions that are executable by a processing device, and upon such execution cause the processing device to perform operations comprising:
adjusting the opacity value of the corresponding blurred versions of images displayed in the background positions in proportion to a proximity of a respective background position to the foreground position.

26. The computer readable memory device of claim 18, storing further instructions that are executable by a processing device, and upon such execution cause the processing device to perform operations comprising:
defining one or more dimensions of a multidimensional path according to one or more functions; and arranging the foreground and background positions along a multidimensional path.

27. The computer readable memory device of claim 26, wherein the one or more functions comprise an arcuate function.

28. The computer readable memory device of claim 18, storing further instructions that are executable by a processing device, and upon such execution cause the processing device to perform operations comprising:
defining one or more dimensions of a multidimensional path according to one or more parabolic functions; and
arranging the foreground position and the background positions along the multidimensional path.

29. A system, comprising:
means for arranging a plurality of display positions along a multidimensional path displayed in a display device:
means for displaying images in the plurality of display positions and for concurrently displaying blurred versions of the images in the plurality of display positions so that each blurred version of an image and the image to which the blurred version of the image corresponds overlay each other; and
means for adjusting an opacity value for each of the blurred versions of the images based on the display positions in which each of the blurred versions of the images is displayed and for adjusting an opacity value for each of the images based on the display positions in which each of the blurred versions of the images is displayed and in substantially linearly inverse proportion to the adjustment of the opacity value of the blurred version of the images that correspond to the images.

30. The method of claim 1, wherein:
the plurality of display positions along the multidimensional path include a foreground position and a plurality of background positions, each of which are located on a corresponding coordinate along a z-axis, the foreground position being at a first coordinate on the z-axis, and plurality of background positions being at respectively increasing coordinates along the z-axis, and the background position at a last coordinate along the z-axis is a terminus position, and wherein the z-coordinate difference between the last coordinate and first coordinate is greater than a distance D; and
further comprising:
adjusting an opacity value of a blurred version of an image displayed in a background position at a z-coordinate position greater than the distance D from the first coordinate on the z-axis to a maximum value, and adjusting an opacity value of image displayed in the background position at the z-coordinate position greater than the distance D from the first coordinate on the z-axis to a minimum value;
adjusting an opacity value of a blurred version of an image displayed in a background position at a z-coordinate position less than the distance D from the first coordinate on the z-axis and an opacity value of image displayed in the background position at the z-coordinate position less than the distance D from the first coordinate on the z-axis according to a ratio of the z-coordinate position to the distance D; and
adjusting an opacity value of a blurred version of an image displayed in the foreground position to a minimum value, and adjusting the opacity value of an image displayed in the foreground position to maximum value.

31. The computer readable medium of claim 18, wherein:
the plurality of display positions along the multidimensional path include a foreground position and a plurality of background positions, each of which are located on a corresponding coordinate along a z-axis, the foreground position being at a first coordinate on the z-axis, and plurality of background positions being at respectively increasing coordinates along the z-axis, and the background position at a last coordinate along the z-axis is a terminus position, and wherein the z-coordinate difference between the last coordinate and first coordinate is greater than a distance D; and
further comprising instructions that are executable by the processing device, and upon such execution cause the processing device to perform operations comprising:
adjusting an opacity value of a blurred version of an image displayed in a background position at a z-coordinate position greater than the distance D from the first coordinate on the z-axis to a maximum value, and adjusting an opacity value of image displayed in the background position at the z-coordinate position greater than the distance D from the first coordinate on the z-axis to a minimum value;
adjusting an opacity value of a blurred version of an image displayed in a background position at a z-coordinate position less than the distance D from the first coordinate on the z-axis and an opacity value of image displayed in the background position at the z-coordinate position less than the distance D from the first coordinate on the z-axis according to a ratio of the z-coordinate position to the distance D; and
adjusting an opacity value of a blurred version of an image displayed in the foreground position to a minimum value, and adjusting the opacity value of an image displayed in the foreground position to maximum value.

* * * * *

UNITED STATES PATENT AND TRADEMARK OFFICE
CERTIFICATE OF CORRECTION

| | | |
|---|---|---|
| PATENT NO. | : 7,743,338 B2 | |
| APPLICATION NO. | : 11/530824 | |
| DATED | : June 22, 2010 | |
| INVENTOR(S) | : Thomas Michael Madden | |

It is certified that error appears in the above-identified patent and that said Letters Patent is hereby corrected as shown below:

On the face page, in field (57), under "Abstract", in column 2, line 3, after "of the" delete "of the".

In column 1, line 42, after "of the" delete "of the".

In column 2, line 39, delete "diagrams" and insert -- diagram --, therefor.

In column 4, line 44, delete "rotation" and insert -- rotational --, therefor.

In column 21, line 58, in Claim 19, after "computer" insert -- readable --.

In column 23, line 17, in Claim 29, delete "device:" and insert -- device; - --, therefor.

Signed and Sealed this
Twenty-fifth Day of October, 2011

David J. Kappos
*Director of the United States Patent and Trademark Office*